United States Patent [19]
Abe

[11] Patent Number: 5,555,294
[45] Date of Patent: Sep. 10, 1996

[54] COMMUNICATION METHOD AND APPARATUS

[75] Inventor: Shintaro Abe, Fujisawa, Japan

[73] Assignee: Canon Kabushiki Kaisha, Tokyo, Japan

[21] Appl. No.: 483,880

[22] Filed: Jun. 7, 1995

Related U.S. Application Data

[63] Continuation of Ser. No. 224,997, Apr. 7, 1994, abandoned, which is a continuation of Ser. No. 708,215, May 31, 1991, abandoned.

[30] Foreign Application Priority Data

Jun. 5, 1990 [JP] Japan ................................ 2-145468
Jun. 26, 1990 [JP] Japan ................................ 2-165654

[51] Int. Cl.$^6$ .................................................. H04M 11/00
[52] U.S. Cl. ...................................... 379/100; 379/94
[58] Field of Search .......................... 379/100, 94, 96, 379/97, 98, 93

[56] References Cited

U.S. PATENT DOCUMENTS

| | | | |
|---|---|---|---|
| 4,746,986 | 5/1988 | Tanigawa | 379/100 |
| 4,888,766 | 12/1989 | Ogasawara | 370/95.1 |
| 4,951,310 | 8/1990 | Honda et al. | 379/309 |
| 4,958,343 | 9/1990 | Abramovici et al. | 379/94 |

FOREIGN PATENT DOCUMENTS

| | | |
|---|---|---|
| 0357427 | 3/1990 | European Pat. Off. . |
| 0065559 | 3/1990 | Japan ................................ 379/100 |
| 0134966 | 5/1990 | Japan ................................ 379/100 |
| 0145056 | 6/1990 | Japan ................................ 379/100 |
| 0294151 | 12/1990 | Japan ................................ 379/100 |
| 1134716 | 3/1991 | Japan ................................ H04M 1/32 |
| 1186112 | 5/1991 | Japan ................................ H04M 11/00 |

OTHER PUBLICATIONS

"Switch Access Architecture for Quad Voice Lines," IEEE Infocom '89, vol. 2, Apr. 1989, Tzung–Pao, pp. 647–654.

"Design of a PC Interface Card for Office Communications Using the ISDN Basic Access," IEEE Journal on Selected Areas in Communications, Willems, vol.7, No. 2, 1987, pp. 295–302.

European Patent Application EP 0349346. Ogawa, 379/100, Jan. 1990.

*Primary Examiner*—Curtis Kuntz
*Assistant Examiner*—Stella L. Woo
*Attorney, Agent, or Firm*—Fitzpatrick, Cella, Harper & Scinto

[57] ABSTRACT

A communication apparatus capable of transmission and reception simultaneously through a plurality of communication channels of an ISDN basic interface has a communication mode which leaves at least one of the plurality of communication channels free. If this mode has been set, transmission or reception is allowed when this one communication channel among the plurality thereof is made free for the transmission or reception.

29 Claims, 6 Drawing Sheets

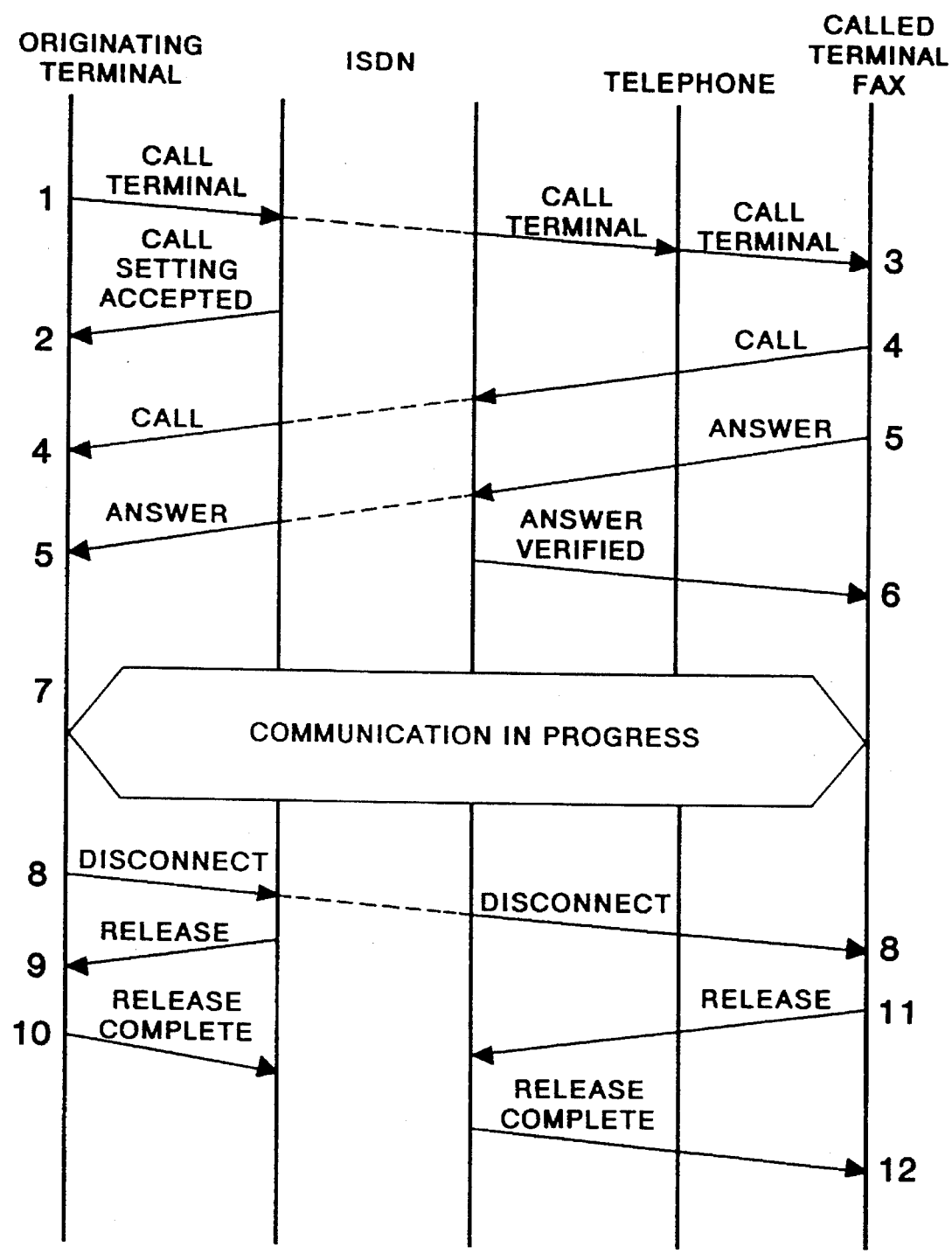
F I G. 3

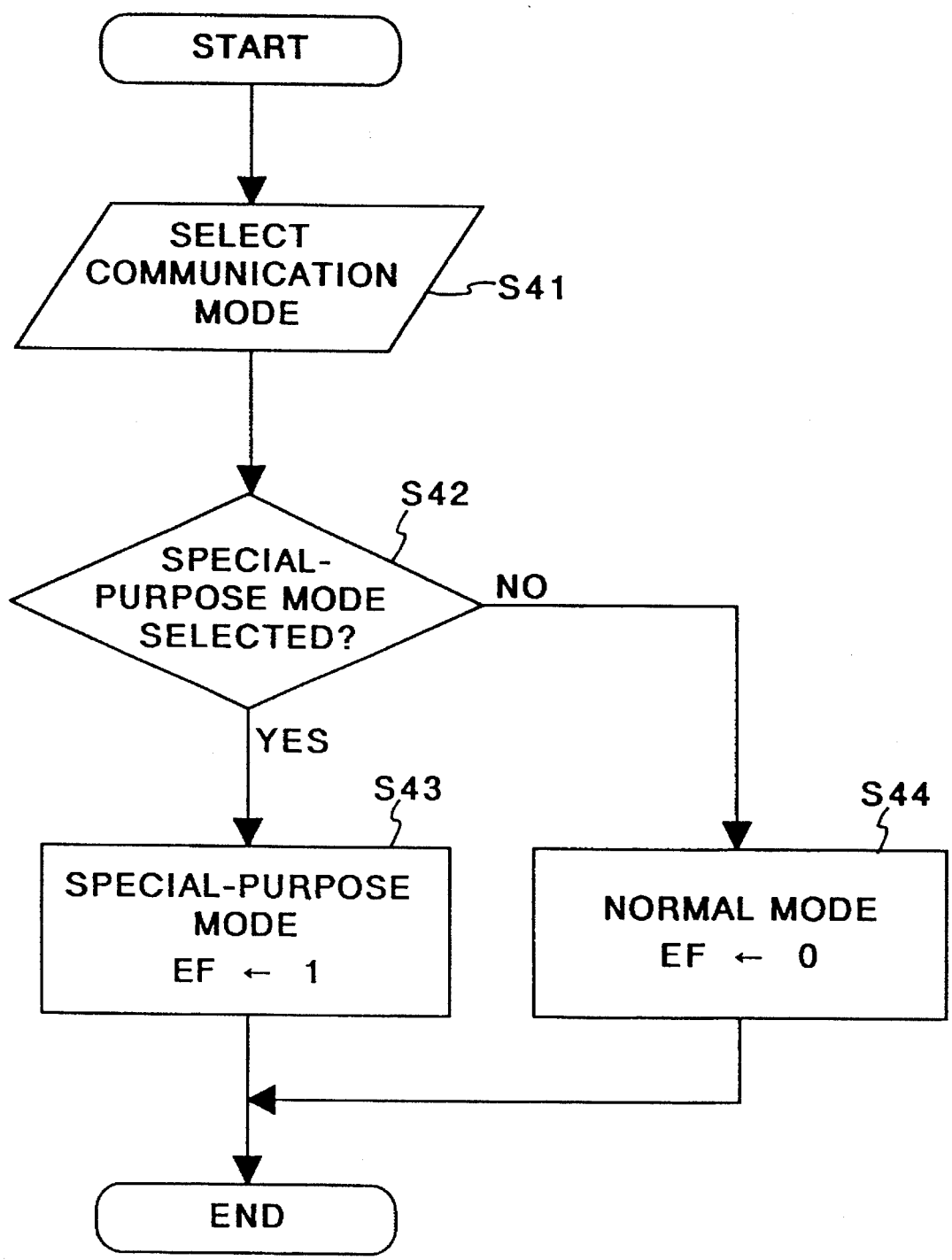
F I G. 4

COMMUNICATION METHOD AND APPARATUS

This application is a continuation of application Ser. No. 08/224,997, filed Apr. 7, 1994, now abandoned, which was a continuation of application Ser. No. 07/708,215, filed May 31, 1991, now abandoned.

BACKGROUND OF THE INVENTION

1. Field of the Invention

This invention relates to a communication apparatus used upon being connected to an ISDN, by way of example. The invention further relates to a communication method using this communication apparatus.

2. Description of the Prior Art

In general, a facsimile apparatus connected to an ISDN is capable of sending and receiving facsimile documents in G3 and G4 modes. An apparatus has also been proposed in which two 64 Kbit/s B channels are used to enable facsimile transmission and reception in the G3 and G4 modes simultaneously in order that a plurality of the B channels of an ISDN can be exploited effectively. When a facsimile apparatus of this kind is used, the plurality of communication channels of the ISDN are employed without distinguishing between facsimile transmission and facsimile reception.

Consequently, in the example of the prior art described above, when a facsimile transmission is being carried out using one B channel, facsimile reception using one other B channel is possible, and therefore a situation can arise in which the two B channels are used for facsimile transmission and reception simultaneously. In such case, transmission/reception of another facsimile signal through this communication line becomes impossible, and a conversation by telephone through this ISDN also can no longer be carried out.

SUMMARY OF THE INVENTION

An object of the present invention is to provide a communication method and apparatus in which, when one channel of an ISDN is being used for transmission (or reception), another channel of the ISDN can be left free for facsimile reception (or transmission).

According to the present invention, there is provided a communication apparatus capable of transmission and reception through a plurality of communication channels, comprising setting means for setting a communication mode, and transmitting means which, when a communication mode wherein at least one communication channel is not used has been set by the setting means, is for performing transmission without using this communication channel when transmission has been designated.

According to another aspect of the present invention, there is provided a communication apparatus capable of transmission and reception through a plurality of communication channels, comprising setting means for setting a communication mode, discriminating means which, when a communication mode wherein at least one communication channel is not used has been set by the setting means, is for discriminating whether all other communication channels are busy when there is an incoming call, and receiving means so adapted as not to receive the incoming call when the discriminating means discriminates that all other communication channels are busy.

Another object of the present invention is to provide a communication method and apparatus so adapted that when one communication channel is being used for facsimile communication, another communication channel is left free so that it can be used for telephonic communication.

According to the present invention, the foregoing object is attained by providing a communication apparatus capable of performing transmission and reception simultaneously through a plurality of communication channels of an ISDN basic interface, comprising means for setting a communication mode, and transmission-enable means which, when at least one communication channel among the plurality of communication channels is placed in an idle state for transmission in accordance with the communication mode, allows this transmission to take place.

According to another aspect of the present invention, the foregoing object is attained by providing a communication apparatus capable of performing transmission and reception simultaneously through a plurality of communication channels of an ISDN basic interface, comprising means for setting a communication mode, and reception-enable means which, when at least one communication channel among the plurality of communication channels is placed in an idle state for an incoming call in accordance with the communication mode, allows reception in response to this incoming call to take place.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 3 is a diagram for describing a basic terminal connection sequence in an ISDN;

FIG. 4 is a flowchart for describing a communication-mode selection procedure executed by a CPU in the present embodiment;

DESCRIPTION OF THE PREFERRED EMBODIMENT

A preferred embodiment of the present invention will now be described with reference to the accompanying drawings.

Figure 1A:
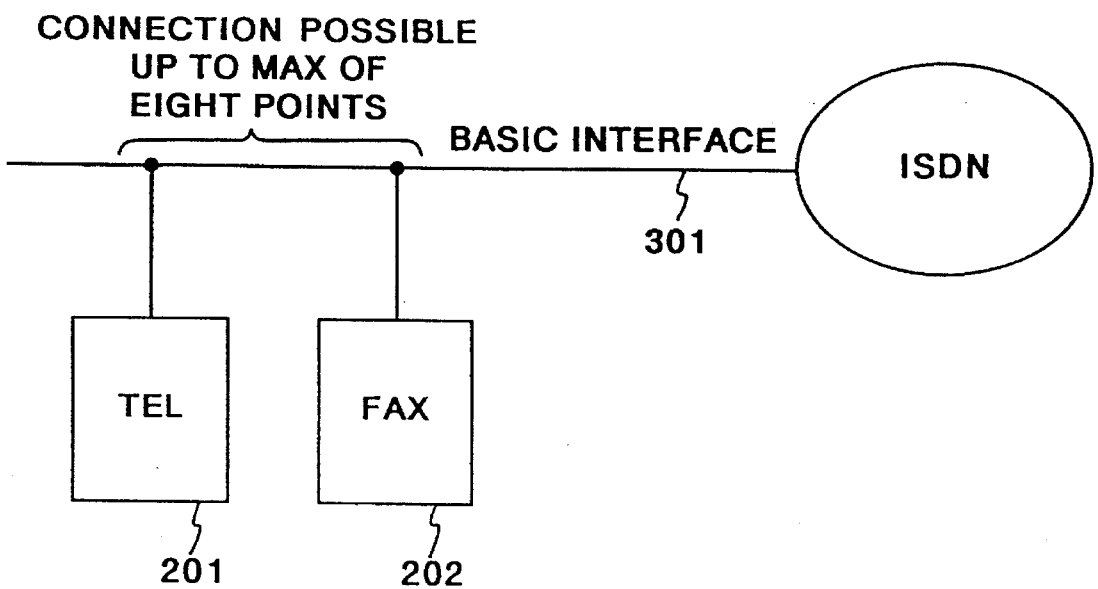
FIGS. 1A and 1B are diagrams illustrating examples of terminal connections by a basic interface in an ISDN to which the present invention is capable of being applied.
Figure 1B:
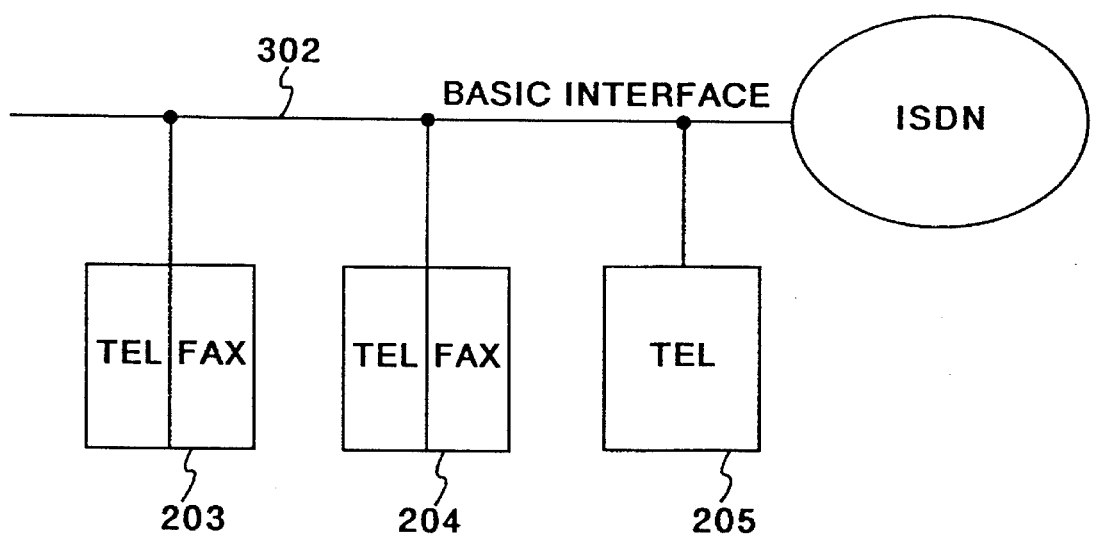

FIGS. 1A and 1B are diagrams illustrating examples of terminal connections by a basic interface in an ISDN to which the present invention is capable of being applied.

In FIGS. 1A and 1B, numerals 301, 302 denote buses connected to an ISDN. A telephone 201 and a facsimile terminal 202 are connected to the bus 301 in FIG. 1A, and facsimile terminals 203, 204, each of which is equipped with a telephone, and a telephone 205 are connected to the bus 302 in FIG. 1B. The basic interface has two 64 Kbit/s information channels (B channels) and one 16 Kbit/s signal channel (D channel). By virtue of bus-type 1:n ($n \leq 8$)

wiring, a plurality of terminal devices can be connected on one set of wires and are capable of communicating with the ISDN simultaneously.

In FIG. 1A, the telephone 201 and facsimile terminal 202 connected to the bus 301 serve as ISDN terminals. In FIG. 1B, the facsimile terminals 203, 204 and telephone 205 connected to the bus 302 likewise serve as ISDN terminals. In accordance with 1:n wiring (bus wiring), ISDN terminals can be connected up to a maximum of eight points with regard to a user having one subscriber line.

The switching control method according to the present invention is applicable both in a case where the telephone 201 and facsimile terminal 202 possess separate interfaces on the bus 301, as shown in FIG. 1A, and a case where facsimile terminals possess one interface on the bus 302, as illustrated by the facsimile terminals 203, 204 equipped with their own telephones in FIG. 1B.

Figure 2:
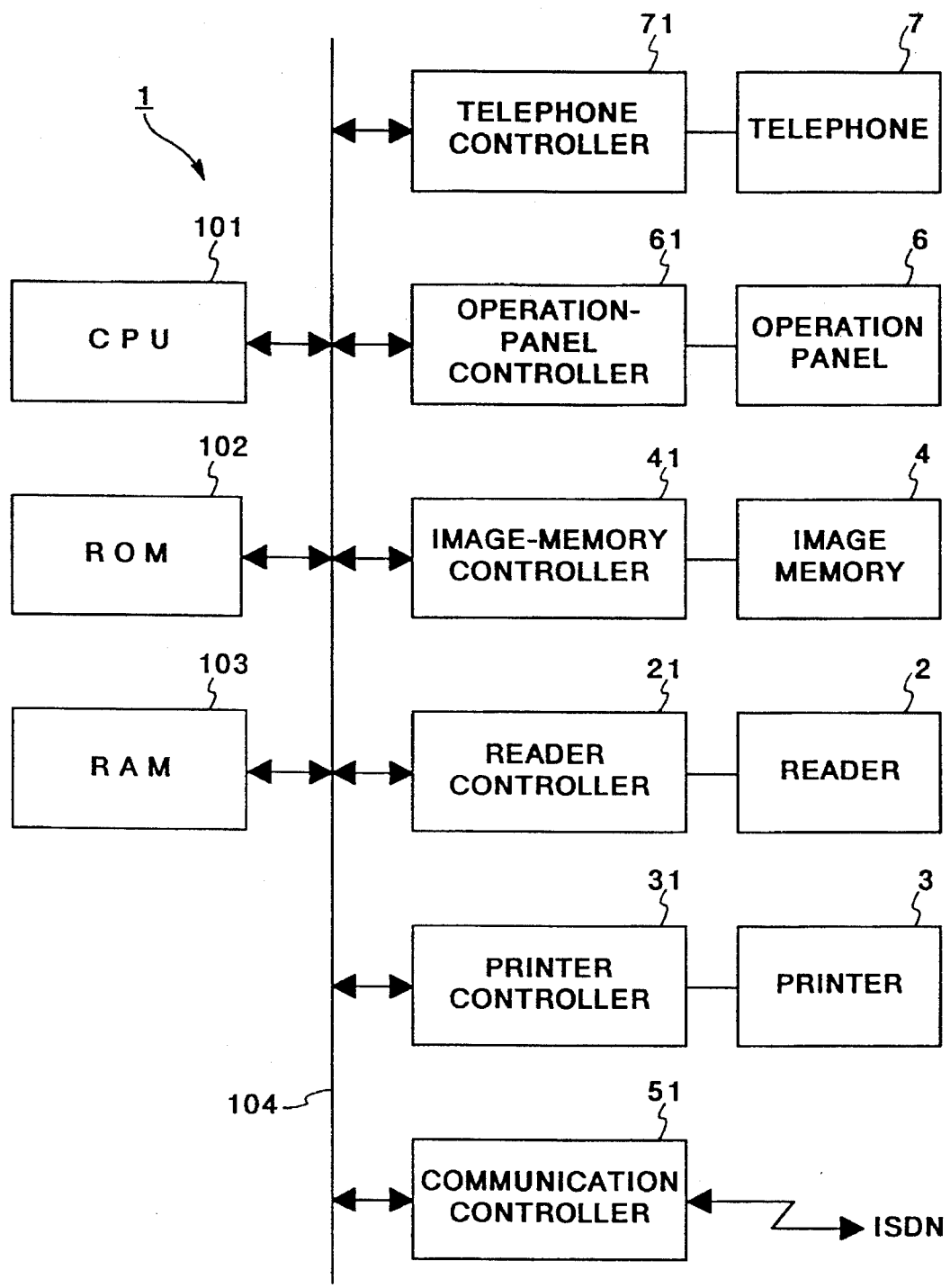
FIG. 2 is a block diagram illustrating the construction of a facsimile apparatus connected to an ISDN according to an embodiment of the present invention.

FIG. 2 is a block diagram illustrating the construction of a facsimile terminal connected to an ISDN according to an embodiment of the present invention.

This terminal is a facsimile terminal having a telephone function. In FIG. 2 showing the hardware configuration of the terminal, numeral 1 denotes a central controller comprising a CPU 101, a ROM 102 storing various data as well as a control program executed by the CPU 101, and a RAM 103. The central controller 1 controls the overall facsimile terminal based upon the programs stored in the ROM 102. The ROM 102 stores programs in accordance with the flowcharts shown in FIGS. 4, 5 and 6, described later. The RAM 103 is used as a working area during operation of the CPU 101 and temporarily preserves various data.

A variety of controllers are connected to the CPU 101 via a system bus 104. A reader controller 21 controls a reader 2 which reads data for transmission, namely a document to be transmitted. A printer controller 31 controls a printer 3, which performs printing based upon image data inputted at the time of facsimile reception, etc. An image-memory controller 41 controls the reading and writing of image data stored in an image memory 4.

At the time of a facsimile transmission, the reader 2 reads the document to be transmitted and outputs original-image data, in the form of a digital signal, to the system bus 104 via the reader controller 21. Under the control of the image-memory controller 41, the original-image data is stored temporarily in the image memory 4. At transmission, the image data stored in the image memory 4 is encoded by the image-memory controller 41, and the encoded data is sent to the ISDN via a communication controller 51. At the time of transmission, the image-memory controller 41 encodes the image data from the image memory 4 and outputs the encoded data to the system bus 104; at the time of reception, the image-memory controller 41 decodes the image data received and stored in the image memory 4, and transfers the decoded data to the printer 3 via the system bus 104 and printer controller 31.

The printer 3 has a printing mechanism for reproducing the original image from the sending side on recording paper by using the decoded image data, namely the image data which enters in page units, by way of example. The printing mechanism can be of any appropriate type, such as one using a thermal recording system, a laser-beam system or the like.

Facsimile transmission/reception of the kind described above is carried out via the communication controller 51. The latter is a unit which controls communication inclusive of facsimile communication and conversion by telephone, described below.

The facsimile terminal of this embodiment has, in addition to the image reading and printing mechanisms described above, an operation panel 6 for operating the terminal, an operation-panel controller 61, a telephone 7 for conversion, and a telephone controller 71.

The operation panel 6 is provided with various switches manipulated by the operator. These switches include switches generally required on the control panel of an ordinary facsimile apparatus, such as a communication start switch, a transmission stop key, etc.

Since the facsimile terminal possesses a telephone function, a ten-key pad, namely a dial-key pad, is used for entering the telephone numbers of other parties. These keys can be provided on the operation panel 6. The latter is further provided with various switches for designating a called terminal number, for designating a communication mode inclusive of a subaddress, and for designating a priority transmission.

FIG. 3 is a diagram for describing a basic terminal connection sequence in an ISDN.

The procedure illustrated in FIG. 3 is composed of the following steps (1) through (12):

① When an originating terminal starts making a call setting, the originating terminal transmits a call-setting message. The call-setting message contains a calling/called terminal number (inclusive of a subaddress), transfer capability and conformability verification information, etc.

② If a B channel is capable of being used, the ISDN sends a call-setting reception message to the calling terminal.

③ Meanwhile, the call-setting message arrives at a plurality of terminals connected to the bus on the receiving party's side. As mentioned above, the call-setting message contains a calling/called terminal number (inclusive of a subaddress), the transfer capability and the conformability verification information. Based on this message, each terminal is capable of determining whether a response should be made or not. A terminal transmits an acknowledging answer message only if it is judged that communication is possible.

④ Depending upon the called terminal, there are cases where the call-setting message cannot be answered immediately. In order to inform of this, the terminal sends a message (call) to the ISDN. When the call message is received, the ISDN sends this call message to the originating terminal in order to inform it of the fact that the called terminal is being called.

⑤ The answer message indicates that a call is capable of being accepted and requests that a communication path for this purpose be set. At this time the ISDN sends this message to the originating terminal in order to inform it of the fact that the called terminal has answered and that a communication path has been set.

⑥ In response to the answer message from the called terminal, the ISDN sends back an answer verification message.

⑦ Thus, the originating terminal and the called terminal enter a data-transfer phase and carry out communication.

⑧ If the connection is broken during this communication, the terminal requesting the disconnection sends a disconnect-request message to the ISDN. In the case of FIG. 3, the terminal on the originating side is shown to be the terminal issuing the disconnect request.

⑨ and ⑩ If the disconnect request has been issued, first the ISDN and the terminal accept the disconnect request and then transmit a release message to inform of the fact that the B-channel call number has been disconnected.

⑪ and ⑫ The terminal which has issued the disconnect request and the ISDN answer the release message by a disconnect-complete message. Thus, the original state is restored, namely the state which prevailed prior to the call setting.

Operation from call setting to completion of disconnection is executed in accordance with the foregoing procedure.

The operation of the facsimile terminal according to this embodiment will now be described.

FIG. 4 is a flowchart for describing a communication-mode selection procedure executed by the CPU 101 in the present embodiment. The control program for executing this processing has been stored in ROM 102.

First, when a communication mode is selected by the operator using the operation panel 6 at step S41, the type of communication mode selected is discriminated at step S42. In a case where a special-purpose mode is selected that allows only one communication channel of the ISDN to be used for facsimile transmission or reception, a special-purpose mode flag (EF) is set to "1" at step S43. In all other cases, a normal-mode flag (EF) is set to "0" at step S44. The normal mode allows communication channels to be used in an ordinary manner. Whether or not the special-purpose mode is selected is designated by the operator using a switch provided on the operation panel.

The communication mode is thus selected.

Figure 5:
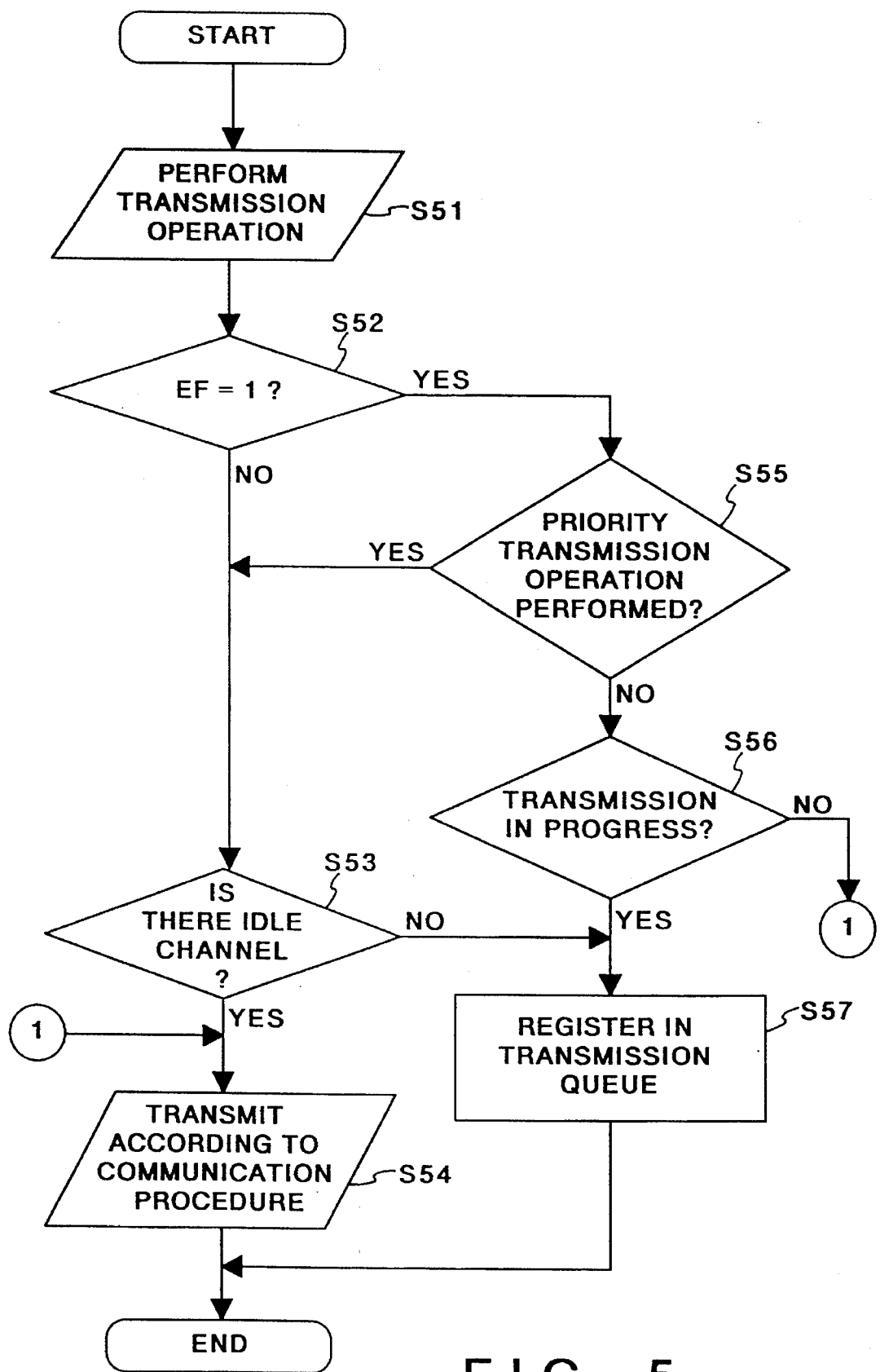
FIG. 5 is a flowchart for describing a transmission procedure executed by the CPU in the present embodiment.

FIG. 5 is a flowchart for describing the transmission procedure executed by the CPU 101 of this embodiment.

After the communication mode has been selected in accordance with the flowchart shown in FIG. 4, the operator designates a transmission operation (ordinary transmission or priority transmission) at step S51 in FIG. 5 using the operation panel 6. When this is done, the program proceeds to step S52, at which it is determined whether the special-purpose mode has been selected. If the flag EF is not "1", namely if the normal mode is in effect, the program proceeds to step S53, at which it is determined whether there is a free (idle) communication channel. If there is such a channel, transmission is performed at step S54 in accordance with the communication procedure.

If the normal mode (EF="0") is in effect but there is no idle channel, then the program proceeds from step S53 to step S57 where a registration is made in a transmission queue.

If the flag EF is found to be "1" at step S52, meaning that the special-purpose mode is in effect, then the program proceeds to step S55, at which it is determined whether the priority-transmission operation has been performed. If the special-purpose mode is in effect and the priority-transmission operation has been designated, the program proceeds to step S53 so that processing from step S53 onward is executed just as in the case of the normal mode. On the other hand, if the special-purpose mode is in effect and the priority-transmission operation has not been performed, the program proceeds to step S56, at which processing for the original special-purpose mode is executed. That is, if it is determined at step S56 that a transmission is currently underway using one communication channel, the program proceeds to step S57. Here, in order to leave the other communication channel for reception, the transmission is not allowed and a registration is made in the transmission queue.

If all channels are found to be free at step S56, the program proceeds to step S54, at which transmission is carried out via the one communication channel (i.e., transmission is allowed).

Thus, in transmission processing, transmission is controlled in such a manner that one communication channel will always be idle.

Figure 6:
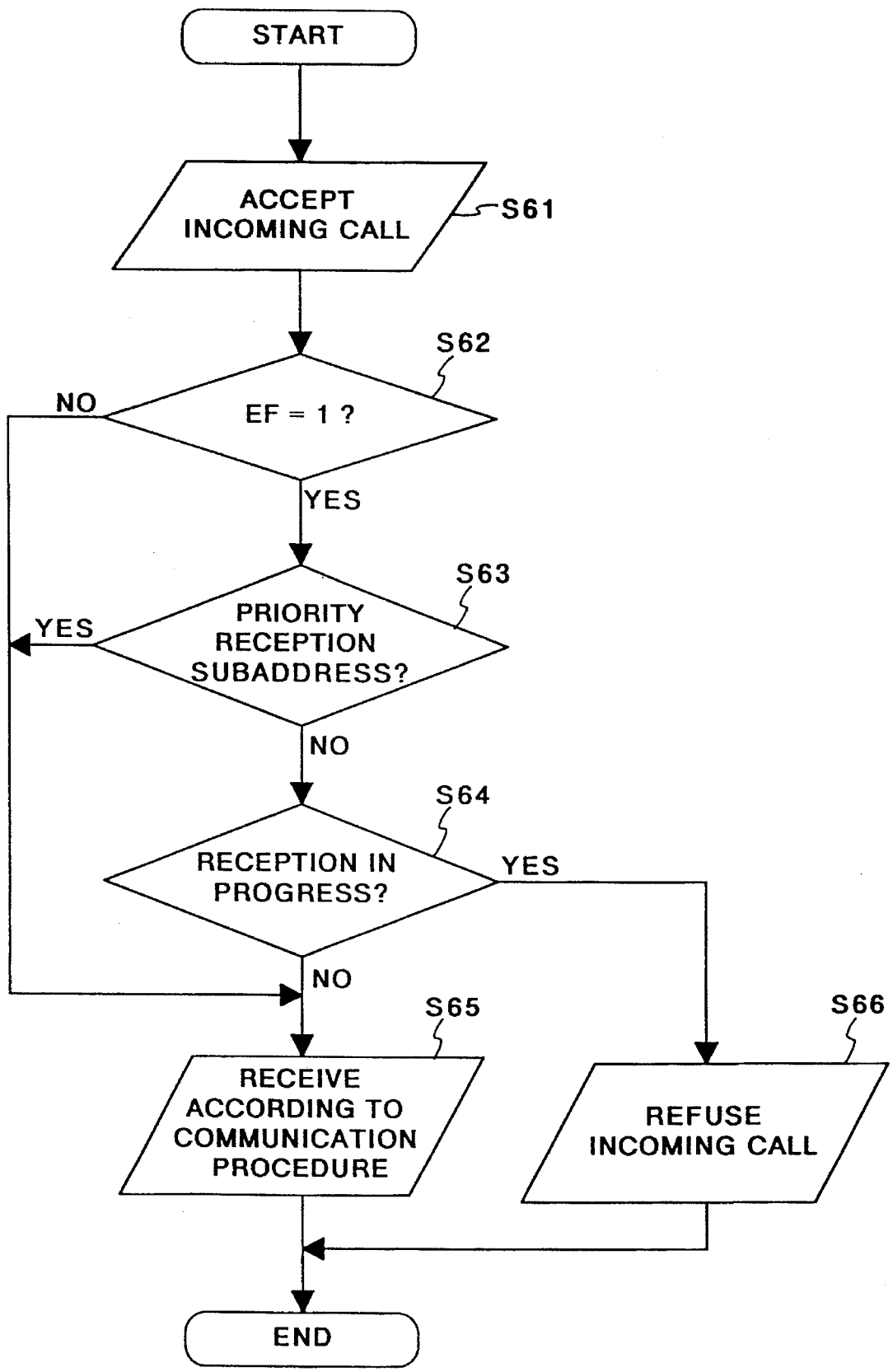
FIG. 6 is a flowchart for describing a reception procedure executed by the CPU in the present embodiment.

FIG. 6 is a flowchart for describing the reception procedure executed by the CPU 101 of this embodiment.

First, at step S61, an incoming call is accepted from the D channel of the ISDN. Next, the program proceeds to step S62. If the special-purpose mode is not in effect; or if the special-purpose mode is in effect (flag EF="1") and the subaddress portion of the called terminal indicates a reception-priority subaddress while the call-setting message is being transmitted (steps S63→S65); or if the special-purpose mode is in effect and reception is not in progress despite the fact that the subaddress portion of the called terminal does not indicate a reception-priority subaddress (steps S64→S65); the program proceeds to step S65, where the incoming call is answered and reception is carried out in accordance with the communication procedure.

On the other hand, if the special-purpose mode is in effect and reception is already in progress (inclusive of the case where the subaddress portion of the called terminal does not indicate a reception-priority subaddress) using one communication channel, the program proceeds to step S66 through steps S62, S63 and S64. At step S66, reception is not allowed, the incoming call is refused and processing is terminated.

Thus, in accordance with the present embodiment, as described above, there is provided a facsimile terminal capable of communicating simultaneously with a plurality of parties through a plurality of communication channels using one communication line. In this facsimile terminal, one channel of the communication channels is left free for reception (or transmission) during facsimile transmission (or reception), thereby making facsimile reception (or transmission) possible at all times. This makes the facsimile terminal easier and more convenient to use.

Further, by adopting the foregoing arrangement, one communication channel is left free for communication by telephone during facsimile transmission/reception, thereby making communication by telephone possible at all times, even during facsimile transmission/reception. This makes the facsimile terminal easier and more convenient to use.

Further, though the foregoing embodiment deals with a facsimile apparatus, the invention is not limited to this embodiment. The invention covers all communication apparatus capable of transmission/reception simultaneously through a plurality of communication channels.

Moreover, though the foregoing embodiment deals with a facsimile apparatus connected to an ISDN, this does not impose a limitation upon the invention. The present invention is applicable to all communication apparatus capable of transmission/reception upon being connected to a communication line accommodating a plurality of communication channels.

The present invention can be applied to a system composed of a plurality of devices or to an apparatus comprising a single device. In addition, it goes without saying that the present invention is applicable to a case where the invention can be achieved by supplying a system or apparatus with a program for implementing the invention.

As many apparently widely different embodiments of the present invention can be made without departing from the spirit and scope thereof, it is to be understood that the invention is not limited to the specific embodiments thereof except as defined in the appended claims.

What is claimed is:

1. A communication apparatus capable of communication through a plurality of communication channels, wherein plural independent communications can be performed concurrently over respective communication channels, each independent communication being performed in one of a plurality of different types of communication modes, and each communication channel being capable of performing communication in any of the types of communication modes, said apparatus comprising:

setting means for setting a special purpose mode to limit availability for use of the plurality of communication channels for performing communication in a kind of the types of communication modes;

input means for inputting a communication request including the type of communication mode; and communication control means, responsive to the communication request, for discriminating whether the type of communication mode corresponding to the communication request is currently being performed through some of the plurality of communication channels, for discriminating whether an available communication channel exists, and for performing a communication corresponding to the communication request in accordance with the type of communication mode which is currently being performed and the available communication channel, wherein, in a case where the special purpose mode is set, said communication control means performs a communication corresponding to the communication request in accordance with the discrimination of whether the type of the communication mode is currently being performed even if the available communication channel exists, and in a case where the special purpose mode is not set, said communication control means performs the communication corresponding to the communication request by using the available communication channel.

2. The apparatus according to claim 1, further comprising priority-mode setting means for setting a communication mode in which priority is given to transmission, wherein, in a case where the priority is given to transmission by said priority-mode setting means, said communicating control means performs transmission corresponding to the communication request by using the available communication channel.

3. The apparatus according to claim 1, wherein said communicating means transmits a facsimile signal through one of the plurality of the communication channels, and another communication channel of the plurality of communication channels is used in reception of a facsimile signal.

4. The apparatus according to claim 1, wherein said communicating means transmits a facsimile signal through one of the plurality of the communication channels, and another communication channel is used in communication by telephone.

5. The apparatus according to claim 1, wherein said communication channels are B channels of an ISDN.

6. The apparatus according to claim 1, wherein the type of communication mode includes a facsimile transmission mode.

7. The apparatus according to claim 1, wherein the type of communication mode includes a facsimile reception mode.

8. The apparatus according to claim 1, wherein the plurality of communication channels include two data channels, and said communicating means performs the communication in the type of communication mode when both of the two data channels are not to be used in the type of communication mode.

9. The apparatus according to claim 1, wherein, in a case where the special purpose mode is set and a transmission request in input by said input means, said communication control means discriminates whether a current transmission other than transmission corresponding to the transmission request is being performed through some of the plurality of communication channels, and performs the transmission corresponding to the transmission request when the current transmission is not being performed and the available communication channel exists.

10. The apparatus according to claim 1, wherein, in a case where the special purpose mode is set and a reception request is input by said input means, said communication control means discriminates whether a current reception other than reception corresponding to the reception request is being performed through some of the plurality of communication channels, and performs the reception corresponding to the reception request when the current reception is not being performed.

11. The apparatus according to claim 1, wherein, in a case where the special purpose mode is set and the type of communication mode corresponding to the communication request is currently being performed through some of the plurality of communication channels, said communication control means delays performance of the communication corresponding to the communication request, even if the available communication channel exists.

12. The apparatus according to claim 11, wherein said communication control means includes connecting means for connecting the plurality of communication channels.

13. The apparatus according to claim 11, wherein said communication control means communicates in a priority mode irrespective of a setting of the special purpose mode by said setting means.

14. The apparatus according to claim 11, wherein said communication control means discriminates the state of one of two data channels of one of said communication channels.

15. A communication method for communication through a plurality of communication channels, wherein plural independent communications can be performed concurrently over respective communication channels, each independent communication being performed in one of a plurality of different types of communication modes, and each communication channel being capable of performing communication in any of the types of communication modes, said method comprising the steps of:

setting a special purpose mode to limit availability for using the plurality of communication channels for performing communication in a kind of the types of communication modes;

inputting a communication request including the type of communication mode;

discriminating whether the type of communication mode corresponding to the communication request is currently being performed through some of the plurality of communication channels, responsive to the communication request;

discriminating whether an available communication channel exists;

performing a communication corresponding to the communication request in accordance with the type of communication mode which is currently being performed and the available communication channel, wherein, in a case where the special purpose mode is set, performing the communication corresponding to the communication request in accordance with the discrimination of whether the type of the communication mode is currently being performed even if the available communication channel exists, and in a case where the special purpose mode is not set, performing the communication corresponding to the communication request by using the available communication channel.

16. The method according to claim 15, further comprising the step of:

in a case where the priority is given to transmission, performing transmission corresponding to the communication request by using the available communication channel.

17. The method according to claim 15, wherein the type of communication mode includes a facsimile transmission mode.

18. The method according to claim 15, wherein the type of communication mode includes a facsimile reception mode.

19. The method according to claim 15, wherein the plurality of communication channels include two data channels, and when both of the two data channels are not to be used in the type of communication mode, the communication in the type of communication mode is performed.

20. The method according to claim 15, wherein the plurality of communication channels are B channels of an ISDN.

21. The method according to claim 15, further comprising the step of:

in a case where the special purpose mode is set and the type of communication mode corresponding to the communication request is currently being performed through some of the plurality of communication channels, delaying performance of the communication corresponding to the communication request even if the available communication channel exists.

22. The method according to claim 15, further comprising the steps of:

in a case where the special purpose mode is set and a transmission request is input, discriminating whether a current transmission other than transmission corresponding to the transmission request is being performed through some of the plurality of communication channels; and performing the transmission corresponding to the transmission request when the current transmission is not being performed and the available communication channel exists.

23. The method according to claim 15, further comprising the steps of:

in a case where the special purpose mode is set and a reception request is input, discriminating whether a current reception other than reception corresponding to the reception request is being performed through some of the plurality of communication channels; and performing the reception corresponding to the reception request when the current reception is not being performed.

24. A communication apparatus capable of performing transmission and reception concurrently and independently through a plurality of communication channels, each communication channel being capable of performing transmission and reception, said apparatus comprising:

setting means for setting a special purpose mode to limit availability for using said plurality of communication channels for performing transmission or reception;

input means for inputting a transmission request or a reception request; and communication control means, responsive to the transmission request or a reception request, for discriminating whether a current transmission other than transmission corresponding to the transmission request or a current reception other than reception corresponding to the reception request is being performed through some of the plurality of communication channels, for discriminating whether an available communication channel exists, and for performing the transmission corresponding to the transmission request or the reception corresponding to the reception request in accordance with the current transmission or the current reception and the available communication channel, wherein, in a case where the special purpose mode is set, said communication control means performs the transmission corresponding to the transmission request or the reception corresponding to the reception request in accordance with the current transmission or the current reception even if the available communication channel exists, and in a case where the special purpose mode is not set, said communication control means performs the transmission corresponding to the transmission request or the reception request by using the available communication channel.

25. The apparatus according to claim 24, wherein the plurality of communication channels are B channels of an ISDN.

26. The apparatus according to claim 24, wherein the plurality of communication channels consist of two data channels.

27. A communication method capable of performing transmission and reception concurrently and independently through a plurality of communication channels, each communication channel being capable of transmission and reception, said method comprising the steps of:

setting a special purpose mode to limit availability for use of the plurality of communication channels for performing transmission or reception;

inputting a transmission request or a reception request; and discriminating whether a current transmission other than transmission corresponding to the transmission request or a current reception other than reception corresponding to the reception request is being performed through some of the plurality of communication channels;

discriminating whether an available communication channel exists: and performing the transmission corresponding to the transmission request or the reception corresponding to the reception request in accordance with the current transmission or the current reception and the available communication channel, wherein, in a case where the special purpose mode is set, performing the transmission corresponding to the transmission request or the reception corresponding to the reception request in accordance with the current transmission or the current reception even if the available communication channel exists, and in a case where the special purpose mode is no set, performing the transmission corresponding to the transmission request or the reception request by using the available communication channel.

28. The method according to claim 27, wherein the plurality of communication channels are B Channels of an ISDN.

29. The method according to claim 27, wherein the plurality of communication channels consist of two data channels.

* * * * *

UNITED STATES PATENT AND TRADEMARK OFFICE
CERTIFICATE OF CORRECTION

PATENT NO. : 5,555,294

DATED : September 10, 1996

INVENTOR(S): SHINTARO ABE

Page 1 of 2

It is certified that error appears in the above-identified patent and that said Letters Patent is hereby corrected as shown below:

ON TITLE PAGE, AT [56] REFERENCES CITED, U.S. PATENT DOCUMENTS

Insert:  --4,825,461  4/1989  Kurita et al.
         4,785,355  11/1988  Mastumoto
         4,974,097  11/1990  Keneko et al.--.

ON TITLE PAGE, AT [56] REFERENCES CITED, FOREIGN PATENT DOCUMENTS

"1134716" should read --1-134716--
"1186112" should read --1-186112--.

COLUMN 4

Line 28, "③" should read --②--.

COLUMN 7

Line 36, "communicating" should read --communication--,

Line 41, "communicating" should read --communication control--

Line 58, "communicating" should read --communication control--;

Line 64, "in" should read --is--.

UNITED STATES PATENT AND TRADEMARK OFFICE
CERTIFICATE OF CORRECTION

PATENT NO. :   5,555,294

DATED        :   September 10, 1996

INVENTOR(S):   SHINTARO ABE

It is certified that error appears in the above-identified patent and that said Letters Patent is hereby corrected as shown below:

<u>COLUMN 10</u>

Line 54, "no" should read --not--;
Line 59, "Channels" should read --channels--.

Signed and Sealed this

Eighteenth Day of August, 1998

Attest:

BRUCE LEHMAN

*Attesting Officer*          *Commissioner of Patents and Trademarks*